United States Patent
Fujimura et al.

(10) Patent No.: US 9,182,139 B2
(45) Date of Patent: Nov. 10, 2015

(54) ROOM PRESSURE CONTROLLING SYSTEM

(75) Inventors: Takashi Fujimura, Tokyo (JP);
Yasuhito Oomagari, Tokyo (JP)

(73) Assignee: Azbil Corporation, Tokyo (JP)

( * ) Notice: Subject to any disclaimer, the term of this patent is extended or adjusted under 35 U.S.C. 154(b) by 672 days.

(21) Appl. No.: 13/448,586

(22) Filed: Apr. 17, 2012

(65) Prior Publication Data

US 2012/0270488 A1 Oct. 25, 2012

(30) Foreign Application Priority Data

Apr. 22, 2011 (JP) ................................. 2011-095852

(51) Int. Cl.
 *F24F 11/02* (2006.01)
 *B08B 15/02* (2006.01)
 *F24F 11/00* (2006.01)

(52) U.S. Cl.
 CPC ..... *F24F 11/0001* (2013.01); *F24F 2011/0042* (2013.01)

(58) Field of Classification Search
 CPC ....................... F24F 11/0001; F24F 2011/0042
 USPC .................................................. 454/56, 255
 See application file for complete search history.

(56) References Cited

U.S. PATENT DOCUMENTS 3,002,382 A * 10/1961 Gardner ........................ 702/138
4,117,773 A * 10/1978 Johnson .......................... 454/64
4,485,729 A * 12/1984 Crittenden et al. ........... 454/255
4,497,242 A * 2/1985 Moyer ............................ 454/61
5,115,728 A * 5/1992 Ahmed et al. .................. 454/61
5,720,658 A * 2/1998 Belusa ........................... 454/255
5,988,860 A * 11/1999 Hefferen et al. ............... 454/58
6,154,686 A * 11/2000 Hefferen et al. ............... 454/59
6,644,092 B1 * 11/2003 Oppel ........................... 73/1.61
6,694,759 B1 * 2/2004 Bash et al. .................... 454/255
7,749,053 B2 * 7/2010 Behns et al. .................. 454/238
2007/0209653 A1 * 9/2007 Beisheim et al. ............... 126/80

FOREIGN PATENT DOCUMENTS

JP        9-201540 A     8/1997
JP        2004-138270 A  5/2004

OTHER PUBLICATIONS

Ito, et al, JP09-201540 A English machine translation, Aug. 5, 1997.*
Sugihara, et al, JP 2004-138270 A English machine translation, May 13, 2004.*

* cited by examiner

*Primary Examiner* — Alissa Tompkins
*Assistant Examiner* — Phillip E Decker
(74) *Attorney, Agent, or Firm* — Troutman Sanders LLP

(57) ABSTRACT

A room pressure controlling system having a supply air valve, a common exhaust air valve, controllers, and a differential pressure sensor. The controller gradually changes a supply and an exhaust airflow rates when there is an airflow rate change controlling operation, and calculates, based on a setting value and a pressure difference that is measured by the differential pressure sensor, a correction control output value for the valve being operated as the room pressure controlling valve, and if the sum value of the control output value and the correction control output value is a value that causes operation of the room pressure controlling valve in the direction opposite of the desired direction, suspends the output of the sum value, but if the value causes the room pressure controlling valve to operate in the desired direction, outputs the sum value to the room pressure controlling valve.

2 Claims, 6 Drawing Sheets

FIG. 6

| Time (seconds) | 0 | 0.5 | 1 | 1.5 | 2 | 2.5 | 3 | 3.5 | 4 | 4.5 | 5 | 5.5 | 6 | 6.5 | 7 | 7.5 | 8 | 8.5 | 9 | 9.5 | 10 |
|---|---|---|---|---|---|---|---|---|---|---|---|---|---|---|---|---|---|---|---|---|---|
| Supply air control output value | 400 | 400 | 410 | 410 | 420 | 420 | 430 | 430 | 440 | 440 | 450 | 450 | 460 | 460 | 470 | 470 | 480 | 480 | 490 | 490 | 500 |
| Exhaust air control output value | 200 | 200 | 210 | 210 | 220 | 220 | 230 | 230 | 240 | 240 | 250 | 250 | 260 | 260 | 270 | 270 | 280 | 280 | 290 | 290 | 300 |
| Correction control output value | 0 | 1 | 2 | −1 | −2 | 1 | 0 | −1 | −2 | −1 | 0 | 1 | 2 | 1 | 2 | 1 | 0 | −1 | −2 | −1 | 0 |
| Sum value | 200 | 201 | 212 | 209 | 218 | 221 | 230 | 229 | 238 | 239 | 250 | 251 | 262 | 261 | 272 | 271 | 280 | 279 | 288 | 289 | 300 |
| Value outputted to the valve | 200 | 201 | 212 | 212 | 218 | 221 | 230 | 230 | 238 | 239 | 250 | 251 | 262 | 262 | 272 | 272 | 280 | 280 | 288 | 289 | 300 | ns

ROOM PRESSURE CONTROLLING SYSTEM

CROSS REFERENCE TO RELATED APPLICATIONS

The present application claims priority under 35 U.S.C. §119 to Japanese Patent Application No. 2011-095852, filed Apr. 22, 2011, which is incorporated herein by reference.

TECHNICAL FIELD

The present invention relates to a room pressure controlling system for maintaining a constant room pressure through controlling the supply airflow and exhaust airflow of a room.

BACKGROUND

In chemical experiments, during the process of the external operations, often biochemical substances that are harmful to humans are produced. Fume hoods are used as one type of equipment to prevent these biochemical substances from being diffused into a room and to prevent them from coming into contact with the human body. Typically, fume hoods are provided with an enclosure having a sash that can be opened either vertically or horizontally, where an operator in the laboratory can access the inside of the enclosure through the sash. So that the operator will not be exposed to harmful biochemical substances during the operations using the fume hood, the enclosure is connected to a local exhaust duct that removes the biochemical substances.

The room pressure controlling system is a system for maintaining a constant pressure within a room so that when biochemical substances are handled within a fume hood, the airflow rate of the local exhaust duct is adjusted so as to maintain a specific speed for the planar airflow rate within the sash plane so that there is no backflow of biochemicals into the room, so that biochemical substances do not leak out of the room and that contamination, and like, will not leak into the room (See, for example, Japanese Unexamined Patent Application Publication H9-201540). FIG. 8 is a diagram illustrating the structure of a conventional room pressure controlling system. The room pressure controlling system includes fume hoods 101-1 and 101-2 that are disposed within the room 100; local exhaust ducts 102-1 and 102-2 that are connected to the fume hoods 101-1 and 101-2; a supply air duct 103 for supplying supply air to the room 100; a common exhaust duct 104 for the air of the room 100; local exhaust air valves EXV1 and EXV2 for regulating the airflow rates of the local exhaust ducts 102-1 and 102-2; a supply air valve MAV for regulating the airflow rate of the supply air duct 103; a common exhaust air valve GEX for regulating the airflow rate of the common exhaust duct 104; controllers 105-1 and 105-2 for controlling the local exhaust air valves EXV1 and EXV2; a controller 106 for controlling the supply air valve MAV; a controller 107 for controlling the common exhaust air valve GEX; and communication lines 108 for connecting together the various controllers 105-1, 105-2, 106, and 107. The fume hoods 101-1 and 101-2 are provided with sashes 111-1 and 111-2 that can be opened and closed, and sash sensors 112-1 and 112-2 for detecting the degrees of opening of the sashes 111-1 and 111-2.

In this type of room pressure controlling system, in order to maintain the pressure of the room 100 at the setting value, the degrees of opening of the supply air valve MAV and the common exhaust air valve GEX, and of the local exhaust air valves EXV1 and EXV2, are controlled so that the supply airflow rate of the supply air duct 103, the exhaust airflow rate of the common exhaust duct 104, and the local exhaust airflow rates of the local exhaust ducts 102-1 and 102-2 satisfy the relationship of "Supply airflow rate=common exhaust airflow rate+local exhaust airflow rates+offset airflow rate."

Moreover, in recent years a PCV (pressure control valve) function, for performing stabilized pressure control by adjusting the degree of opening of the PCV valve based on a pressure differential by measuring the pressure differential between the inside and the outside of the room has been added as well. This PCV function is achieved through causing the room pressure controlling operations to be performed as well in addition to the actual functions of either the supply air valve MAV or the common exhaust air valve GEX.

Additionally, there has been a proposal for a system that reduces the supply airflow rate and the common exhaust airflow rate, while maintaining a constant pressure differential between the inside of the room and the outside of the room, in order to achieve energy conservation through reducing the amount of air exchanged, because it is possible to reduce the amount of air exchange during time bands wherein people are not present, such as at night and on weekends when no operations are being performed (See, for example, Japanese Unexamined Patent Application Publication 2004-138270 ("JP '270")). Even when the airflow rates are varied in this way, it is still necessary to control the airflow rates so that the pressure differential between the inside and outside of the room will always be the same.

The process for varying the airflow rates disclosed in JP '270 is performed every day on weekdays. In an example when switching the time band from daytime to nighttime, the degree of opening of the PCV (which is either the supply air valve or the common exhaust air valve) is adjusted so as to maintain always a constant pressure differential between the inside and the outside as the supply airflow rate and the common exhaust airflow rate are both reduced gradually. Moreover, in an example of switching the time band from nighttime daytime, the degree of opening of the PCV is corrected so that the pressure differential between the inside and the outside of the room is always constant while the supply airflow rate and the common exhaust airflow rate are both increased gradually. In operations that perform fine adjustments to the opening of the PCV in this way, if, for example, the PCV is opened too much, then, as the correcting operation, an operation is performed in the direction of closing the PCV, and thus a reversing operation is produced in the PCV. Because the life expectancy of the valve is greatly influenced by the frequency of these reversals, there is a problem in that the life expectancy of the valve is shortened through frequently producing reversing operations in the valve. When a valve that handles a PCV function fails, it tends to cause large failures in the room pressure control.

The present invention was created in order to solve the problems set forth above, and the object thereof is to provide a room pressure controlling system able to extend the service life of a valve that is provided with a PCV function and to be able to extend the up-time, and the time between maintenance.

SUMMARY

A room pressure controlling system according to the present invention has a supply airflow rate regulating means for regulating, using a supply air valve, an airflow rate of supply air that is blown into an applicable room; common exhaust airflow rate controlling means for controlling, by a common exhaust air valve, an airflow rate of exhaust air that is drawn from an applicable room; differential pressure measuring means for measuring a pressure difference between the applicable room and a specific reference chamber; supply airflow rate, regulated by the supply air valve, to a specific setting supply airflow rate and a control output value for exhaust air for changing gradually the exhaust airflow rate that is regulated by the common exhaust air valve to a specific setting exhaust airflow rate; correction output calculating means for calculating a correction control output value for a valve, either the supply air valve or the common exhaust air valve, that is being operated as a room pressure controlling valve based on a deviation between a specific setting value and the pressure difference measured by the differential pressure measuring means; summing means for summing the control output value and the correction control output value corresponding to the valve that is being operated as the room pressure controlling valve at the time of an airflow rate change controlling operation; and suspension evaluating means for suspending the output of the sum value when, at the time of an airflow rate change controlling operation, the sum value of the control output value and the correction control output value is a value that operates the room pressure controlling valve in the direction opposite from the desired direction, and for outputting the sum value to the room pressure controlling valve when the sum value is a value that causes the room pressure controlling valve to operate in the desired direction. Moreover, in the first structural example of the room pressure controlling system according to the present invention, the desired direction is a direction that increases the airflow rate of the valve that is being operated as a room pressure controlling valve when increasing the supply airflow rate and the exhaust airflow rate at the time of an airflow rate change controlling operation, and is the direction that reduces the airflow rate of the valve that is being operated as the room pressure controlling valve when the supply airflow rate and the exhaust airflow rate are decreased at the time of an airflow rate change controlling operation. Furthermore, the first structural example of the room pressure controlling system according to the present invention further comprises: a fume hood that is equipped within the applicable room; and local exhaust airflow rate regulating means for regulating, by a local exhaust air valve, an exhaust airflow rate of the fume hood; wherein: the supply airflow rate regulating means and the common exhaust airflow rate regulating means control the supply air valve and the common exhaust air valve so that the difference between the supply airflow rate that is regulated by the supply air valve and the exhaust airflow rate that is regulated by the local exhaust air valve and the common exhaust air valve, during a normal control operation, will match.

The present invention makes it possible to extend the service life of a room pressure controlling valve by eliminating the reversing operations of the room pressure controlling valve through suspending the output of sum value when the sum value of the control output value and the correction control output value at the time of an airflow rate change controlling operation is a value that causes the room pressure controlling valve to operate in a direction that is opposite of the desired direction, and outputting the sum value to the room temperature controlling valve when the sum value is a value that causes the room pressure controlling valve to operate in the desired direction. The present invention makes it possible to extend the service life of the valve, while using an inexpensive valve, thereby enabling a decrease in the system cost.

BRIEF DESCRIPTION OF THE DRAWINGS

FIG. 6 is a diagram illustrating an example of control output values that are outputted to a common exhaust air valve, correction control output values, and sum values, in an example.

DETAILED DESCRIPTION

Figure 1:
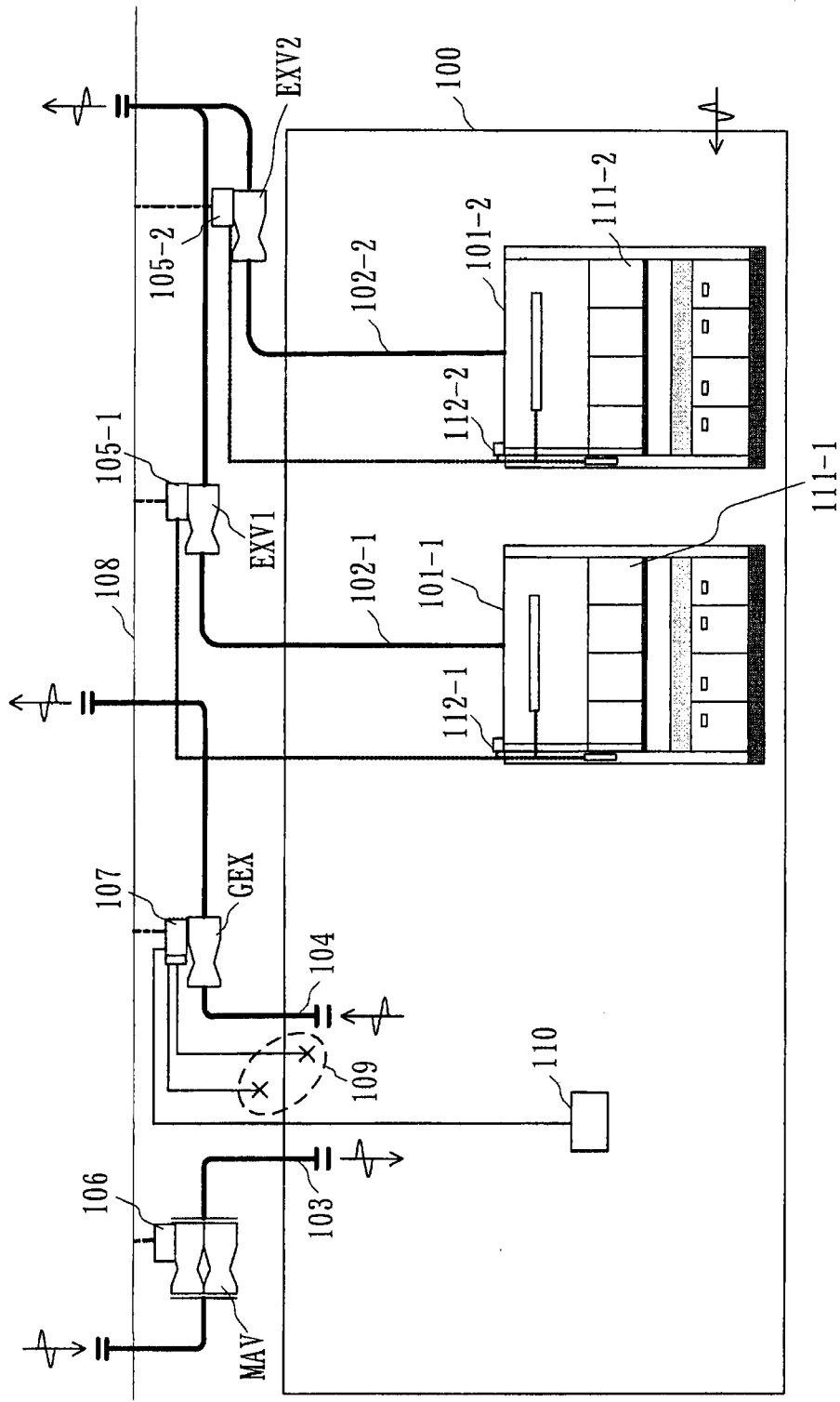
FIG. 1 is a diagram illustrating a structure of a room pressure controlling system according to an example of the present invention.
Figure 8:
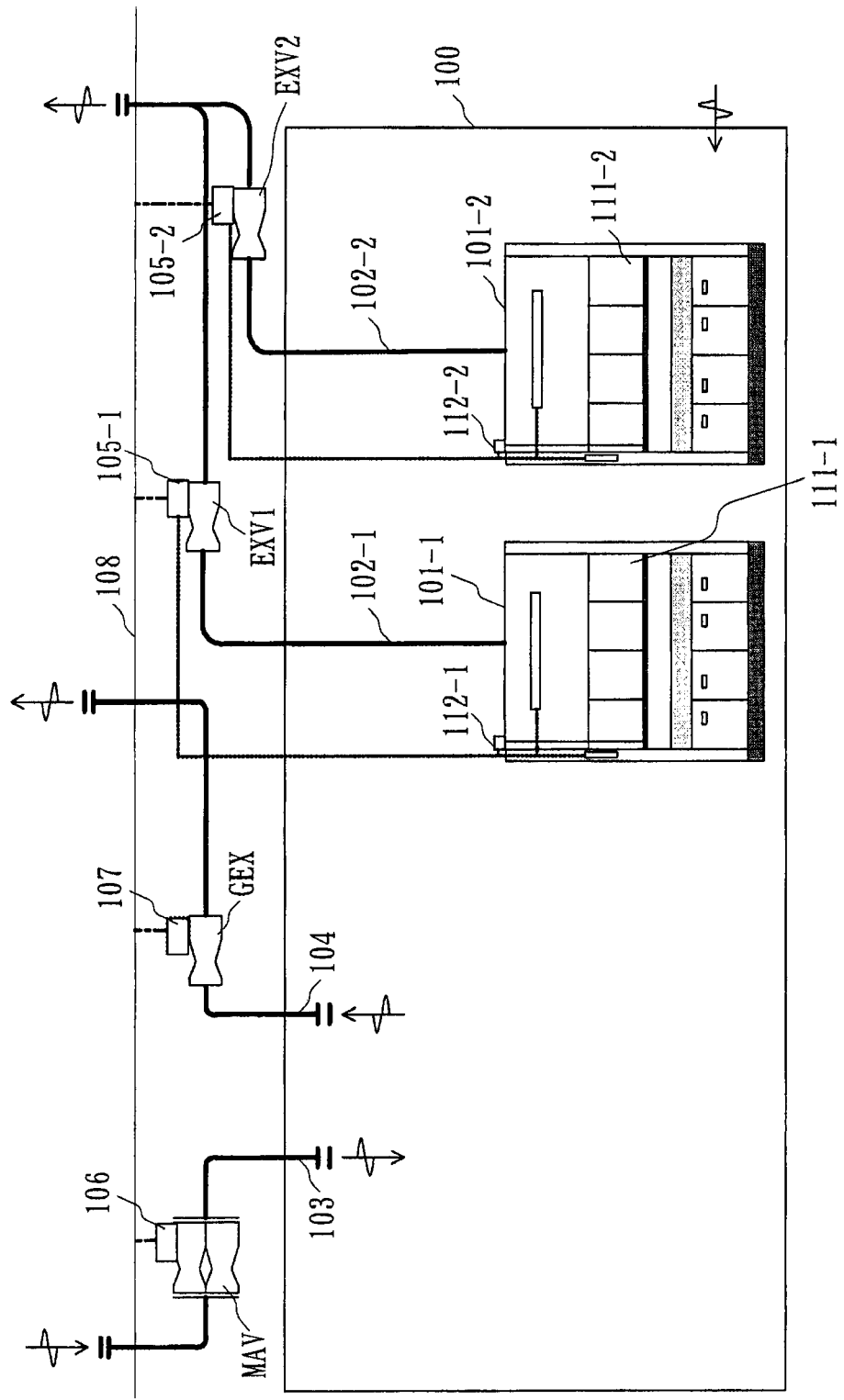
FIG. 8 is a diagram illustrating a conventional structure for a room pressure controlling system.

Forms for carrying out the present invention are explained below in reference to the figures, FIG. 1 is a diagram illustrating a structure for a room pressure controlling system according to the examples of the present invention, where structures that are identical to those of FIG. 8 are assigned identical codes. The room pressure controlling system according to the present example is structured from: fume hoods 101-1 and 101-2 that are disposed within the room 100; local exhaust ducts 102-1 and 102-2; a supply air duct 103; a common exhaust duct 104; local exhaust air valves EXV1 and EXV2; a supply air valve MAV; a common exhaust air valve GEX; controllers 105-1, 105-2, 106, and 107; a communication line 108; a differential pressure sensor 109 for measuring the pressure difference between the room 100 and a specific reference chamber (a space outside of the room 100 in the present form of embodiment); and a room pressure monitor 110 for checking the pressure difference.

Figure 2:
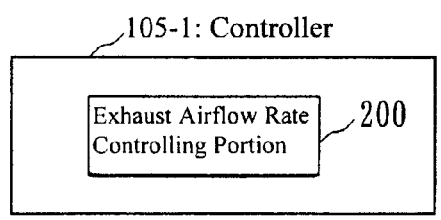
FIG. 2 is a block diagram illustrating an example of a structure for a controller for a local exhaust according to the example.
Figure 3:
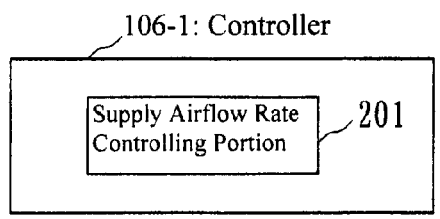
FIG. 3 is a block diagram illustrating an example of a structure for a controller for supply air according to another example.
Figure 4:
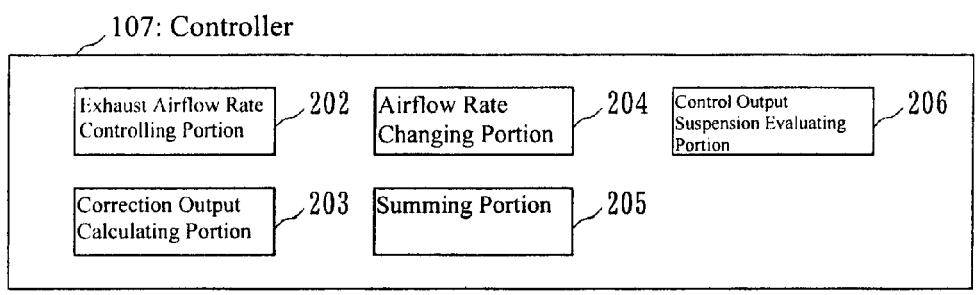
FIG. 4 is a block diagram illustrating an example of a structure for a controller for a common exhaust according to a further example.

FIG. 2 is a block diagram illustrating a structural example of a controller 105-1; FIG. 3 is a block diagram illustrating a structural example of a controller 106; and FIG. 4 is a block diagram illustrating a structural example of a controller 107. The controller 105-1 has an exhaust airflow rate controlling portion 200 for controlling the local exhaust air valve EXV1. The structure of the controller 105-2 is identical to that of the controller 105-1.

The controller 106 has a supply airflow rate controlling portion 201 for controlling the supply air valve MAV. The controller 107 has: an exhaust airflow rate controlling portion 202 for controlling the common exhaust air valve GEX; a correction output calculating portion 203 for calculating a correction control output value for the valve that is operated as the room pressure controlling valve, which is either the supply air valve MAV or the common exhaust air valve GEX, based on a specific setting value for the pressure differential measured by the differential pressure sensor 109; an airflow rate changing portion 204 for changing gradually the supply airflow rate and the exhaust airflow rate at the time of a specific airflow rate changing control operation; a summing portion 205 for summing the correction control output value and the control output value corresponding to the valve that is operated as the room pressure controlling valve during the airflow rate changing control operating hours; and a control output suspension evaluating portion 206 for suspending the output of the sum value when the sum value of the control output value and the correction control output value is a value that causes operation of the room pressure controlling valve in the direction that is opposite from the desired direction at the time of an airflow rate changing control operation, and for outputting, to the room pressure controlling valve, the sum value when the sum value is a value that causes the room temperature controlling valve to operate in the desired direction.

The local exhaust ducts 102-1 and 102-2, the local exhaust air valves EXV1 and EXV2, and the controllers 105-1 and 105-2 structure the local exhaust airflow rate regulating means. The supply air duct 103, the supply air valve MAY, and the supply airflow rate controlling portion 201 of the controller 106 structure supply airflow rate regulating means. The common exhaust duct 104, the common exhaust air valve GEX, and the exhaust airflow rate controlling portion 202 of the controller 107 structure common exhaust airflow rate controlling means.

Note that in the present example, the correction output calculating portion 203, the summing portion 205, the airflow rate changing portion 204, and the control output suspension evaluating portion 206 are provided in the controller 107; however, there is no limitation thereto, but rather the correction output calculating portion 203, the summing portion 205, the airflow rate changing portion 204, and the control output suspension evaluating portion 206 may be provided in a different controller, or may be provided in a central monitoring device, not shown.

The airflow rate balance controlling operation during normal operation of the room pressure controlling system is explained next. Here the supply airflow rate that is blown out from the supply air duct 103 is defined as Vmav, the airflow rate of the exhaust that is drawn out by the common exhaust duct 104 is defined as Vgex, and the airflow rates of the exhausts that are drawn out by the local exhaust ducts 102-1 and 102-2 are defined as Vexv1 and Vexv2.

The exhaust airflow rate controlling portion 200 of the controller 105-1 establishes the airflow rate Vexv1 based on the sash opening area of the fume hood 101-1 so that the planar airflow rate in the plane of the sash is a specified value (normally 0.5 m/s), and controls the degree of opening of the local exhaust air valve EXV1 so that the exhaust airflow rate of the local exhaust duct 102-1 is Vexv1. Similarly, the exhaust airflow rate controlling portion 200 of the controller 105-2 establishes the airflow rate Vexv2 based on the sash opening area of the fume hood 101-2 so that the planar airflow rate in the plane of the sash is a specified value, and controls the degree of opening of the local exhaust air valve EXV2 so that the exhaust airflow rate of the local exhaust duct 102-2 is Vexv2. Note that the sash opening areas of the fume hoods 101-1 and 101-2 can be established by multiplying together the known sash widths by the heights of the opening portions of the sashes 111-1 and 111-2, which can be calculated from the degrees of sash opening detected by the sash sensors 112-1 and 112-2.

The exhaust airflow rate controlling portion 202 of the controller 107 controls the degree of opening of the common exhaust air valve GEX to reduce the airflow rate Vgex by the amounts of change in the exhaust airflow rates Vexv1 and Vexv2 depending on the degree of opening of the sashes, so that the total exhaust airflow rate (Vgex+Vexv1+Vexv2) is constant, to produce a control output value so that the exhaust airflow rate of the common exhaust duct 104 will go to Vgex.

The supply airflow rate controlling portion 201 of the controller 106 controls the degree of opening of the supply air valve MAV by determining an airflow rate Vmav such that at least a minimum airflow rate is always blown out so as to satisfy a minimum exchange airflow rate for the room 100, and producing a control output value so that the supply airflow rate of the supply air duct 103 will go to Vmav. Vmav is set so as to be no less than the minimum exchange airflow rate, in order to maintain the minimum exchange airflow rate of the room 100.

Through the method of setting the airflow rates as set forth above, Equation (1) is satisfied when neither of the fume hoods 101-1 and 101-2 is used (that is, when the sashes 111-1 and 111-2 are completely closed):

$$Vmav = Vgex + \alpha \quad (1)$$

The constant $\alpha$ is an offset airflow rate for not only determining the rate with which air leaks from the room 100, but also for determining whether the room 100 is to be caused to be at positive pressure or negative pressure. In addition, when only fume hood 101-1 is used, then Equation (2) is satisfied:

$$Vmav = Vgex + Vexv1 + \alpha \quad (2)$$

Moreover, when both fume hoods 101-1 and 101-2 are used, then Equation (3) is satisfied:

$$Vmav = Vgex + Vexv1 + Vexv2 + \alpha \quad (3)$$

Note that if, for example, the exhaust airflow rate Vexv1 were to go to the maximum airflow rate (Vexv1)max then the exhaust airflow rate controlling portion 202 of the controller 107 attempts to balance the airflow rates by reducing the airflow rate Vgex; however, even if an attempt were made to balance the airflow rate by an operation to reduce the airflow rate Vgex alone, if the degree of opening of the common exhaust air valve GEX has reached 0%, then the airflow rate Vgex cannot be reduced any further. In such a case, the supply airflow rate controlling portion 201 of the controller 106 regulates the airflow rate Vmav so as to satisfy Equation (4):

$$Vmav = Vgex + (Vexv1)max + Vexv2 + \alpha \quad (4)$$

The room pressure controlling valve (PCV) controlling operations that are performed in parallel with the aforementioned airflow rate balance controlling operations are explained next. In the present example, the common exhaust air valve GEX functions as a PCV. The correction output calculating portion 203 of the controller 107 calculates, through a PID algorithm, the amount of increase in the airflow rate Vgex so that there is no deviation between a setting value SP and the differential pressure dPE, based on the inside/outside pressure difference setting value SP, and the inside/outside pressure differential dPE, measured by the differential pressure sensor 109, and sends a correction control output value to the common exhaust air valve GEX so as to change the exhaust airflow rate Vgex of the common exhaust duct 104 by the calculated amount of increase or decrease.

At this time, because the aforementioned airflow balance controlling operations and the PCV controlling operations are performed in parallel, the summing portion 205 of the controller 107 sums the control output value that is outputted by the exhaust airflow rate controlling portion 202 and the correction control output value that is outputted by the correction output calculating portion 203, and outputs the result to the common exhaust air valve GEX. In this way, at the same time as the adjustment to the degree of opening of the common exhaust air valve GEX by the airflow rate balance controlling operation, fine adjustments to the degree of opening of the common exhaust air valve GEX are performed by the PCV controlling operation, to thereby control the room pressure.

Figure 5:
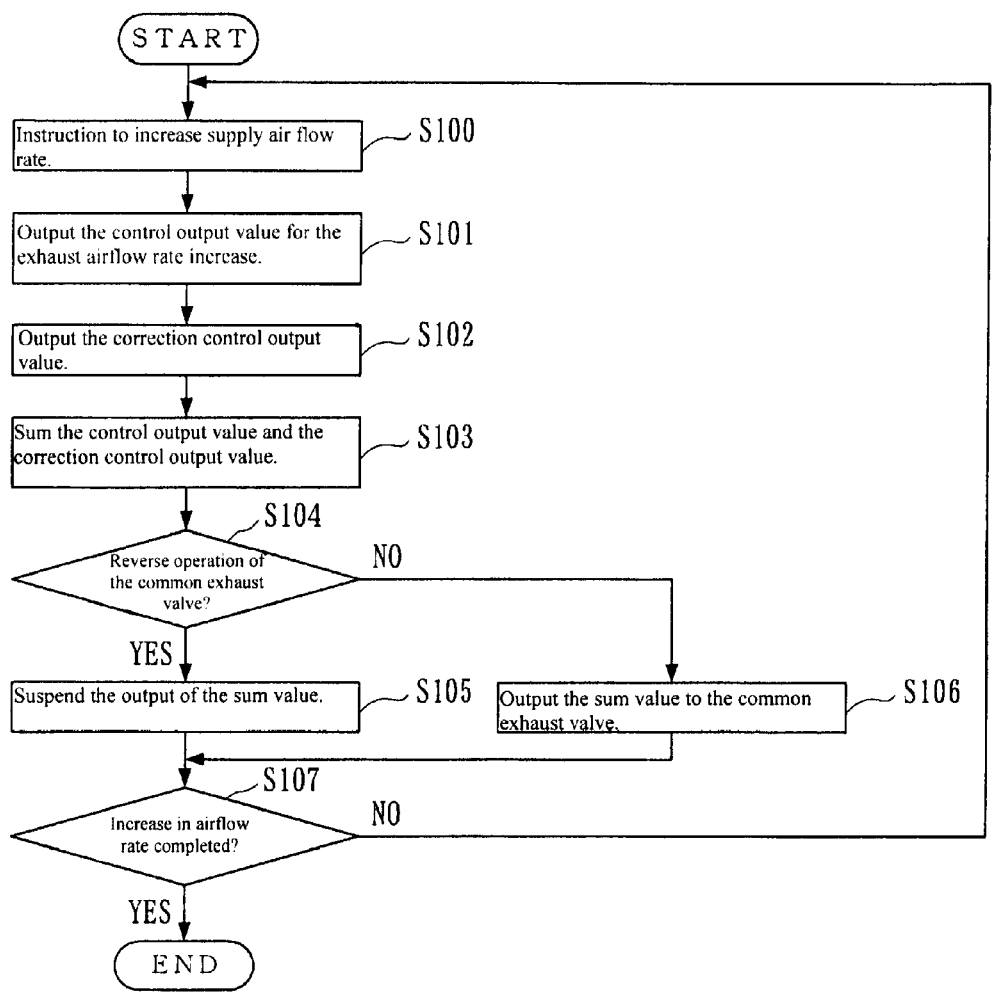
FIG. 5 is a flowchart for explaining an airflow rate change controlling operation in the case of switching from the nighttime to the daytime time band in a room pressure controlling system according to the examples.

The airflow rate change controlling operation is explained next. FIG. 5 is a flowchart for explaining the airflow rate change controlling operation. In the case of switching the time band from daytime to nighttime, the airflow rate changing portion 204 of the controller 107 gradually decreases both the supply airflow rate Vmav and the exhaust airflow rate Vgex, and when switching the time band from nighttime to daytime, the airflow rate changing portion 204 of the controller 107 gradually increases both the supply airflow rate Vmav and the exhaust airflow rate Vgex. Here the explanation is for the operations when the time band is changed from nighttime to daytime.

When switching the time band from nighttime to daytime, the airflow rate changing portion 204 sends instructions to the controller 106 to gradually increase the supply airflow rate Vmav from the nighttime airflow rate value that has been set in advance for the nighttime time band (Step S100). The supply airflow rate controlling portion 201 of the controller 106 controls the degree of opening of the supply air valve MAV by outputting a control output value to produce the supply airflow rate Vmav that has been directed by the airflow rate changing portion 204. Moreover, the airflow rate changing portion 204 sends a control output value for the exhaust so as to increase the exhaust airflow rate Vgex in accordance with the increase in the supply airflow rate Vmav (Step S101). At this time, the exhaust airflow rate Vgex is determined so as to satisfy Equation (1).

The PCV controlling operation described above is performed in parallel also at the time of an airflow rate change controlling operation. That is, the correction output calculating portion 203 calculates, using a PID algorithm, the amount of increase or decrease in the airflow rate Vgex required so that there is no deviation between the setting value SP and the pressure difference dPE, based on the setting value SP for the inside/outside pressure difference and the inside/outside pressure difference dPE measured by the differential pressure sensor 109, to produce a correction control output value so that the exhaust airflow rate Vgex will change by the calculated amount of increase or decrease (Step S102).

The summing portion 205 sums the control output value for the exhaust, outputted by the airflow rate changing portion 204 and the correction control output value outputted by the correction output calculating portion 203 (Step S103). The control output suspension evaluating portion 206 suspends the outputting of the sum value if the sum value of the control output value and the correction control output value is a value that causes the common exhaust air valve GEX to operate in the direction opposite of the desired direction (Step S104: YES), and maintains the immediately previous output value that was outputted to the common exhaust air valve GEX (Step S105). Moreover, the control output suspension evaluating portion 206 outputs the sum value to the common exhaust air valve GEX (Step S106) if the sum value of the control output value and the correction control output value is a value that causes the common exhaust air valve GEX to operate in the desired direction (Step S104: NO). The degree of opening of the common exhaust air valve GEX is determined by the sum value outputted by the control output suspension evaluating portion 206.

Here, the "desired direction" refers to the direction wherein the exhaust airflow rate Vgex is increasing (the direction wherein the common exhaust air valve GEX is opening) in the case of switching the time band from nighttime to daytime, and refers to the direction wherein the exhaust airflow rate Vgex is decreasing (the direction wherein the common exhaust air valve GEX is closing) in the case of switching the time band from daytime to nighttime. Note that when the output of the sum value is suspended, this sum value is discarded.

The processes in Step S100 through S106 are repeated with each control period in this way until the supply airflow rate Vmav reaches the daytime airflow rate value that has been set in advance for the daytime time band (Step S107: YES).

FIG. 6 is a diagram illustrating an example of control output values, correction control output values, and sum values. Here the control period is defined as 0.5 seconds, the nighttime airflow rate value is 400 m$^3$ per hour, the daytime airflow rate value is defined as 2400 m$^3$ per hour, and the offset flow rate a is defined as 200 m$^3$ per hour. Note that the airflow rate changing portion 204 updates the supply airflow rate Vmav and the exhaust airflow rate Vgex in one-second intervals. Moreover, the control output value, the correction control output value, and the sum value are values that indicate the degree of valve opening (between 0 and 100%), but here, for ease in understanding, they are represented as airflow rate values.

In the state at 0 seconds in FIG. 6, the sum value of the supply air control output value for the case of the nighttime time band, the exhaust air control output value, the correction control output value, the sum value of the exhaust air control output value and the correction control output value, and the output value to the common exhaust air valve GEX are shown. The nighttime airflow rate for the supply airflow rate is 400 m$^3$ per hour and the offset airflow rate a is 200 nm per hour, so the exhaust control output value is 200.

In the case of switching the time band from nighttime to daytime, the supply air control output value and the exhaust control output value are increased gradually. Moreover, the correction control output value is outputted from the correction output calculating portion 203 in accordance with the deviation between the pressure difference dPE and the setting value SP. The states at 0.5 seconds and 1 seconds, the sum value of the exhaust control output value and the correction control output value is added, and because the sum value is a value that causes the common exhaust air valve GEX to operate in the desired direction, the sum value is outputted as-is to the common exhaust air valve GEX.

On the other hand, in the state at 1.5 seconds, the sum value of the exhaust control output value and the correction control output value is 209, but this sum value of 209 is a value that is a reduction relative to the value 212 that is outputted immediately previously to the common exhaust air valve GEX, so it is a value that causes the common exhaust air valve GEX to operate in the direction opposite from the desired direction, and thus the output of this sum value 209 is suspended, and the immediately previous output value 212 is outputted to the common exhaust air valve GEX.

In the state at 2 seconds, the sum value of the exhaust control output value and the correction control output value is 218. This sum value of 218 is a value that is an increase relative to the value 212 that is outputted immediately previously to the common exhaust air valve GEX, and thus is a value that causes the common exhaust air valve GEX to operate in the desired direction, and so this sum value 218 is outputted as-is to the common exhaust air valve GEX.

As described above, the present example makes it possible to extend the service life of the common exhaust air valve GEX by eliminating the reversing operations of the common exhaust air valve GEX by suspending control outputs that cause the common exhaust air valve GEX to undergo reversing operations during airflow rate change controlling operations for monotonically increasing the supply airflow rate Vmav and the exhaust airflow rate Vgex. In the airflow rate change controlling operations it is known in advance that the supply airflow rate Vmav and the exhaust airflow rate Vgex increases during the subsequent control period, and thus it is possible to inhibit the reversing operations of the common exhaust air valve GEX, while maintaining control performance, by suspending the output to the common exhaust air valve (GEX temporarily and then, in the subsequent control period, outputting, to the common exhaust air valve GEX, a sum value wherein the correction output value is added to the monotonic increase in the exhaust airflow rate Vgex.

For safety, in a room pressure controlling system it is important to maintain a specific pressure differential so that there is no inversion of the inside/outside pressure difference. The system must fulfill this requirement, and must be a low-cost, long-life, high-reliability system. In order to reduce the cost of the system it is necessary to use inexpensive valves, requiring service-life countermeasures. In the present example, it is possible to reduce the cost of the system through the ability to extend the service life of the valve while using inexpensive valves.

Figure 7:
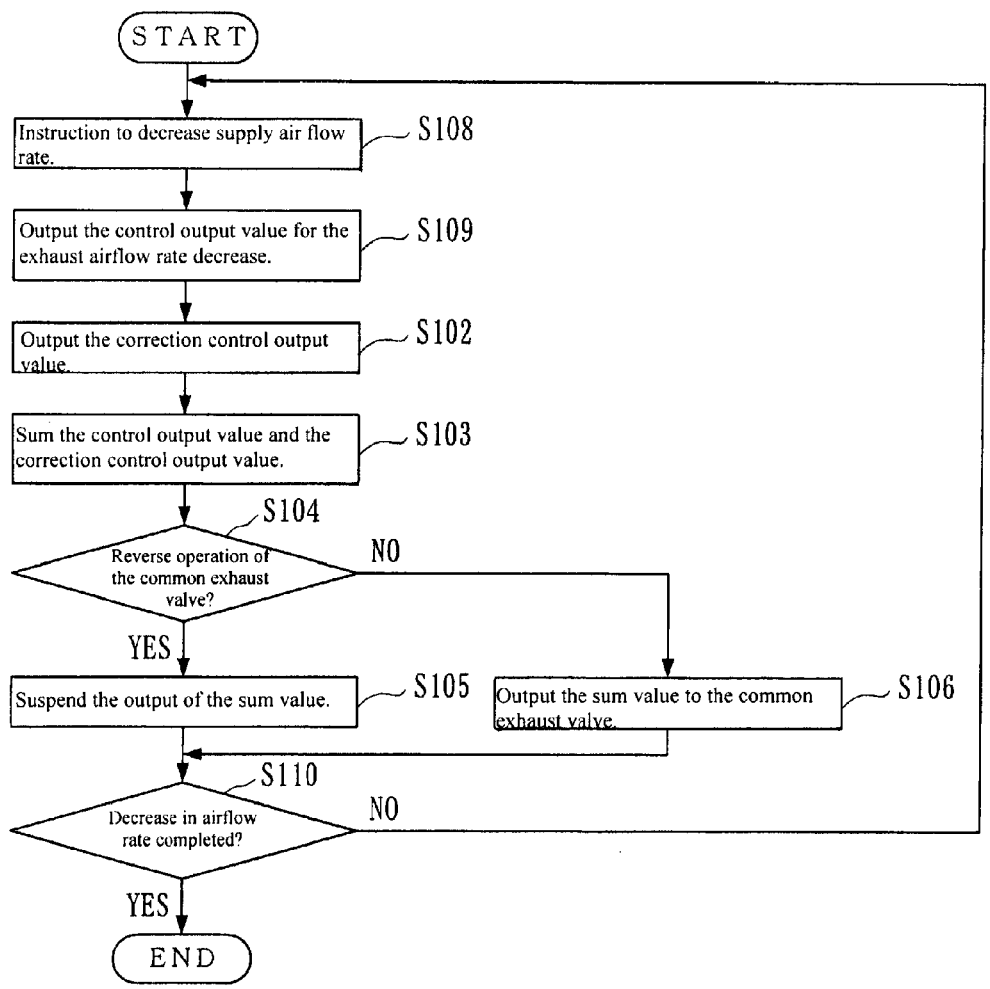
FIG. 7 is a flowchart for explaining an airflow rate change controlling operation in the case of switching from the daytime to the nighttime time band in a room pressure controlling system according to the examples.

Note that while in the present example the explanation was for the operation when switching the time band from nighttime to daytime, the present invention can be applied identically to the case of the supply airflow rate Vmav and the exhaust airflow rate Vgex decreasing monotonically when switching the time band from daytime to nighttime. FIG. 7 is a flowchart for explaining the airflow rate change controlling operation in the case of switching the time band from daytime to nighttime.

When switching the time band from daytime to nighttime, the airflow rate changing portion 204 of the controller 107 sends instructions to the controller 106 to gradually decrease the supply airflow rate Vmav from the daytime airflow rate value (Step S108). The supply airflow rate controlling portion 201 of the controller 106 controls the degree of opening of the supply air valve MAV by outputting a control output value to produce the supply airflow rate Vmav that is directed by the airflow rate changing portion 204. Moreover, the airflow rate changing portion 204 sends a control output value for the exhaust so as to decrease the exhaust airflow rate Vgex in accordance with the decrease in the supply airflow rate Vmav (Step S109). At this time, the exhaust airflow rate Vgex is determined so as to satisfy Equation (1).

The processes in Step S102 through S106 are identical to the case when switching the time band from nighttime to daytime. In the case of switching the time band from daytime to nighttime, the desired direction refers to the direction wherein the exhaust airflow rate Vgex is decreasing (the direction wherein the common exhaust air valve GEX is closing). The processes in the aforementioned Steps S108, S109, S102 through S106 may be performed repetitively, with each control period, until the supply airflow rate Vmav reaches the nighttime airflow rate value (Step S110: YES).

In the present example, the common exhaust air valve GEX functioned as a PCV; however, the supply air valve MAV may be caused to function as the PCV instead. However, when the supply air valve MAV is caused to function as the PCV, the summing portion 205 during normal operation sums the control output value outputted by the supply airflow rate controlling portion 201 of the controller 106 and the correction control output value outputted by the correction output calculating portion 203, and output the result to the supply air valve MAV. Moreover, when there is an airflow rate change controlling operation, the summing portion 205 sums the supply air control output value, outputted by the airflow rate changing portion 204, and the correction control output value, outputted by the correction output calculating portion 203. The operation of the control output suspension evaluating portion 206 is identical to that in the case of when the common exhaust air valve GEX is used as the PCV; however, the sum value of the supply air control output value and the correction control output value are outputted to the supply air valve MAV. When the supply air valve MAV is caused to function as the PCV, the desired direction refers to the direction wherein the supply airflow rate Vmav is increasing (the direction wherein the supply air valve MAV is opening) when switching the time band from nighttime to daytime, and refers to the direction wherein the supply airflow rate Vmav is decreasing (the supply air valve MAV is closing) when the time band is switching from daytime to nighttime.

Each individual controller 105-1, 105-2, 106, and 107 explained in the present example can be embodied through a computer that is provided with a CPU, a memory device, and an interface, and a program for controlling these hardware resources. The CPU of each of these controllers 105-1, 105-2, 106, and 107 executes the processes explained in the present example through a program that is stored in the memory device. Note that while in the present example a fume hood was used as one local exhaust device, the present invention can be applied also to devices that achieve the same role as a fume hood, such as a safety cabinet, and the like.

The present invention can be applied to room pressure controlling systems.

The invention claimed is:

1. An air pressure controlling system comprising:
a supply airflow rate controller regulating, using a supply air valve, an airflow rate of supply air that is blown into an applicable room;
a common exhaust airflow rate controller controlling, by a common exhaust air valve, an airflow rate of exhaust air that is drawn from an applicable room;
a differential pressure measuring device measuring a pressure difference between the applicable room and a specific reference chamber;
an airflow rate changing portion calculating a control output value for the supply air and a control output value for the exhaust air at a time of an airflow rate change controlling operation, the time of an airflow rate change controlling operation comprising either a time of increasing the supply and exhaust airflow rate or a time of decreasing the supply and exhaust airflow rate, wherein
the control output value for the supply air is for changing the supply airflow rate, which is regulated by the supply air valve, to a specific setting supply airflow rate, and
the control output value for the exhaust air is for changing the exhaust airflow rate, which is regulated by the common exhaust air valves to a specific setting exhaust airflow rate;
a correction output calculator calculating a correction control output value for a valve, either the supply air valve or the common exhaust air valve, that is being operated as a room pressure controlling valve, based on a deviation between a specific setting value and the pressure difference measured by the differential pressure measuring device;
a summing device summing the control output value and the correction control output value to obtain a sum value of the control output value and the correction control output value, corresponding to the valve that is being operated as the room pressure controlling valve at the time of the airflow rate change controlling operation; and a suspension evaluator either suspending an output of the sum value or outputting the sum value to the room pressure controlling valve at the time of the airflow rate change controlling operation, wherein the suspension evaluator suspends the output of the sum value when the sum value is a value that would cause the room pressure controlling valve to decrease airflow rate at the time of increasing the supply and exhaust airflow rate or to increase airflow rate at the time of decreasing the supply and exhaust airflow rate, and the suspension evaluator outputs the sum value to the room pressure controlling valve when the sum value is a value that would cause the room pressure controlling valve to increase airflow rate at the time of increasing the supply and exhaust airflow rate or to decrease airflow rate at the time of decreasing the supply and exhaust airflow rate.

2. The room pressure controlling system as set forth in claim 1, further comprising:

a fume hood that is equipped within the applicable room; and a local exhaust airflow rate controller regulating, by a local exhaust air valve, an exhaust airflow rate of the fume hood, wherein:

the supply airflow rate controller and the common exhaust airflow rate controller controls the supply air valve and the common exhaust air valve so that a difference between the supply airflow rate, which is regulated by the supply air valve, and the exhaust airflow rate, which is regulated by the local exhaust air valve and the common exhaust air valve, matches to a predetermined setting value.

* * * * *